United States Patent [19]
Saito

[11] Patent Number: 4,819,099
[45] Date of Patent: Apr. 4, 1989

[54] APPARATUS FOR LONGITUDINAL BIDIRECTIONAL RECORDING WITH EQUAL LENGTH TRACKS

[75] Inventor: Etsuro Saito, Kanagawa, Japan

[73] Assignee: Sony Corporation, Tokyo, Japan

[21] Appl. No.: 942,413

[22] Filed: Dec. 16, 1986

[30] Foreign Application Priority Data

Jan. 16, 1986 [JP] Japan .................................. 61-6691

[51] Int. Cl.$^4$ ........................ G11B 5/52; G11B 15/14; G11B 21/04
[52] U.S. Cl. ....................................... 360/84; 360/64; 360/107
[58] Field of Search .................. 360/10.3, 64, 84, 107

[56] References Cited

U.S. PATENT DOCUMENTS

| | | | |
|---|---|---|---|
| 3,294,902 | 12/1966 | Maxey | 360/64 X |
| 4,040,109 | 8/1977 | Kryltsov | 360/107 |
| 4,285,016 | 8/1981 | Gilovich | 360/84 |
| 4,318,146 | 3/1982 | Ike et al. | 360/107 |
| 4,321,634 | 3/1982 | Lehureau | 360/107 X |
| 4,369,473 | 1/1983 | Eibensteiner | 360/84 X |
| 4,482,928 | 11/1984 | Moriya et al. | 360/84 X |
| 4,609,947 | 9/1986 | Yamagiwa et al. | 360/84 X |

FOREIGN PATENT DOCUMENTS 52-26807  2/1977  Japan .................................. 360/107

OTHER PUBLICATIONS

Pugh, "New Format Video Recorder", IBM Tech. Disc. Bull., vol. 22, No. 4, Sep. 1979.
Zentgraf, "Dual-Sized Magnetic Recording", IBM Tech. Disc. Bull., vol. 15, No. 11, Apr. 1973.

*Primary Examiner*—John H. Wolff
*Attorney, Agent, or Firm*—Ronald P. Kananen

[57] ABSTRACT

A recording and/or reproducing apparatus employs a azimuth-pair-head in a rotary head drum. The rotary head drum is axially shifted by a head shifting means. First tracks are formed on a magnetic tape during forward driving of the magnetic tape across the rotary head drum. On the other hand, second tracks are formed adjacent to the first tracks during reverse driving across the rotary head drum. Since the first and second tracks are formed by means of the azimuth-pair-head, azimuth gaps thereof will have a different or symmetrical obliquity to each other. This successfully avoids cross-talk between adjacent tracks to allow formation of the first and second tracks in a tightly arranged fashion. As a consequence, high-density longitudinal recording without cross-talk between adjacent tracks becomes possible.

32 Claims, 10 Drawing Sheets

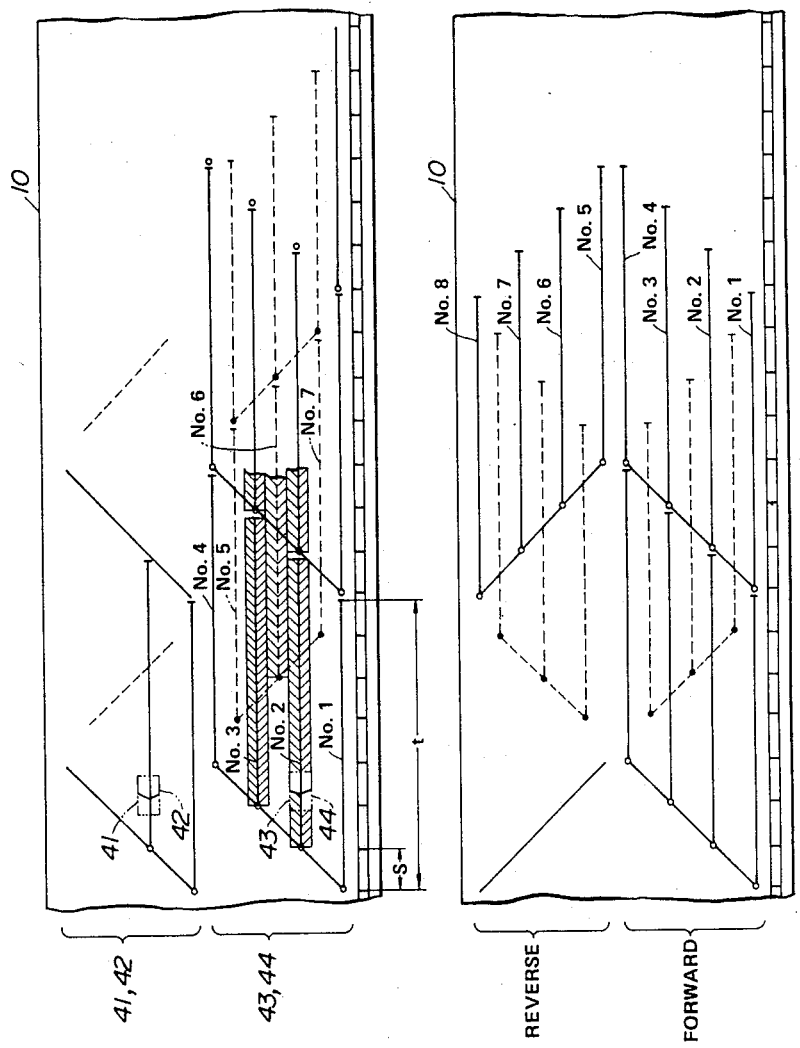

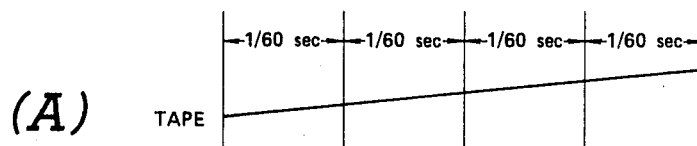
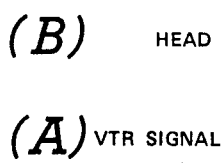
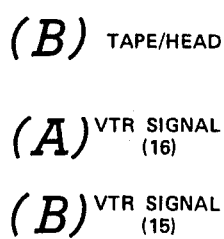

APPARATUS FOR LONGITUDINAL BIDIRECTIONAL RECORDING WITH EQUAL LENGTH TRACKS

BACKGROUND OF THE INVENTION

1. Field of the Invention

The present invention relates generally to a recording and/or reproducing apparatus for recording and/or reproducing information on longitudinal tracks formed on a magnetic tape, such as video tape, pulsecode modulated (PCM) audio tape and so forth. More specifically, the invention relates to a recording and/or reproducing apparatus for longitudinal recording, which allows high-density recording.

2. Description of the Background Art

In the conventional recording and/or reproducing apparatus having a rotary head drum, such as a video tape recorder (VTR), PCM audio player (R-DAT) and so forth, helical recording systems have been employed. As is well known, magnetic tapes are wrapped around the rotary head drums in a helical fashion for recording and/or reproducing information on helical tracks formed on the magnetic tapes. In order to wrap the magnetic tape onto the rotary head drum in a helical fashion, tape paths upstream and downstream of the rotary head drum have to lie in different planes. This makes the structure of the tape paths complicated. Tape loading mechanisms also become complicated. Furthermore, conventional recording and/or reproducing apparatus allows only one-way recording and limits recording capacity of the magnetic tape. Also rewinding of the tape is necessary when a different track is to be used for recording or reproducing. Thus requiring an inconveniently long access period.

For eliminating such defects inherent in the helical scanning-type recording system, there has been proposed a longitudinal recording system. Such a system has been disclosed in the U.S. Pat. No. 4,040,109, issued on Aug. 2, 1977, to Igor Alexervich Kryltosov. In the shown longitudinal recording system, signal processing on the time base can be freely performed by a digitalizing signal processing system. In addition, it becomes possible to harmonize the operation of the mechanical system and signal processing system for cooperation therewith.

On the other hand, in the conventional longitudinal recording system, cross-talk between adjacent recording tracks raises problems. Such problems become more and more serious when high-density recording is attempted. Conventionally, a guard-band is formed between adjacent tracks for avoiding cross-talk. This however prevents high-density longitudinal recording.

On the other hand, the requirement for more compact magnetic tape cassettes, such as VTR tape cassettes, PCM audio cassettes and so forth with substantially high-density longitudinal recording capacity and/or reproducing apparatus is becoming higher.

SUMMARY OF THE INVENTION

Therefore, it is an object of the present invention to provide a recording and/or reproducing apparatus, which can perform high-density longitudinal recording.

Another object of the invention is to provide a longitudinal recording and/or reproducing apparatus which eliminates the requirement for or significantly narrows the width of the guard-band between longitudinal tracks but still successfully avoids cross-talk between adjacent longitudinal tracks.

In order to accomplish the aforementioned and other objects, a recording and/or reproducing apparatus, according to the present invention, employs an azimuth-pair-head in a rotary head drum. The rotary head drum is axially shifted by a head shifting means. First tracks are formed on a magnetic tape during forward driving of the magnetic tape across the rotary head drum. On the other hand, second tracks are formed adjacent to the first tracks during reverse driving across the rotary head drum.

Since the first and second tracks are formed by means of the azimuth-pair-head, azimuth gaps thereof will have a different or symmetrical obliquity to each other. This successfully avoids cross-talk between adjacent tracks to allow formation of the first and second tracks in a tightly arranged fashion. As a consequence, high-density longitudinal recording without cross-talk between adjacent tracks becomes possible.

According to one aspect of the invention, a parallel scanning video tape recording and/or reproducing apparatus for a magnetic tape, comprises a rotary head drum carrying an azimuth-pair-head constituted of first and second magnetic heads, the first magnetic head being formed with a first azimuth gap and the second magnetic head being formed with a second azimuth gap with an azimuth angle different from that of the first azimuth gap, the first and second magnetic heads being cooperative in forming a single longitudinally extending track on a magnetic tape in one cycle of recording operation, the track having a first section formed by means of the first magnetic head and having a first azimuth pattern and a second section formed by means of the second magnetic head and having a second azimuth pattern which is different from the first azimuth pattern of the first section, means for guiding the magnetic tape onto the rotary head drum for recording and reproduction, the guiding means wrapping the magnetic tape on the periphery of the rotary head drum so that the longitudinal axis of the magnetic tape lies perpendicular to the rotation axis of the rotary head drum and that the magnetic tape mates with the periphery of the rotary head drum in a predetermined angular shape, and means, cooperating with the azimuth-pair-head, for shifting the azimuth-pair-head in a direction parallel to the rotation axis of the rotary head drum for switching scanning tracks of the azimuth-pair-head.

The shifting means shifts the azimuth-pair-head in a first direction to form a first group of longitudinal tracks and in a second direction opposite to the first direction to form a second group of longitudinal tracks, each of the longitudinal tracks of the first group being formed in spaced apart relationship to the other for leaving a given clearance therebetween, and each of the longitudinal tracks of the second group being formed in the clearances between the longitudinal tracks of the first group. Each of the longitudinal tracks of the first group has the first section opposing the second section of adjacent longitudinal tracks of the second group.

In one embodiment, the shifting means is operative in synchronism with rotation of the rotary head drum for shifting the azimuth-pair-head to the next track after every one scanning cycle. The shifting means is operative to shift the azimuth-pair-head during a period in which the azimuth-pair-head is out of the predetermined angular range.

The given clearance between the longitudinal tracks of the first group corresponds to the lateral width of the longitudinal track of the second group to be formed therein.

The parallel scanning video tape recording and/or reproducing apparatus performs recording and reproducing both in forward and reverse driving of the magnetic tape, and a scanning angular range over which the azimuth-pair-head scans the magnetic tape is so adjusted as to form longitudinal tracks of equal longitudinal length both in forward recording and reverse recording. In this case, the magnetic tape may be separated into first and second halves by the longitudinal axis thereof, the first half being scanned by the azimuth-pair-head for recording or reproduction while the magnetic tape is driven in a forward direction and the second half being scanned by the azimuth-pair-head while the magnetic tape is driven in a reverse direction. The track pattern formed in the first half is symmetric to that formed in second half.

In the alternative embodiment, the parallel scanning recording and/or reproducing apparatus further comprises auxiliary rotary head drum with an azimuth-pair-head, said auxiliary rotary head drum being designed and arranged for recording and reproducing on the back side of the magnetic tape. The tape guiding means is designed for guiding the magnetic tape onto both of rotary head drums for sequential operation of the rotary head drums.

In another alternative, the rotary head drum is provided with first and second azimuth-pair-heads which are associated with the shifting means to be axially shifted in synchronism with each other. The shifting means comprises a linear motor and movement driven by the linear motor in parallel to the rotation axis of the rotary head drum, the movement carrying the first and second azimuth-pair-heads for simultaneously shifting both heads in axial directions for switching scanning tracks.

According to anther aspect of the invention, a parallel scanning video tape recording and/or reproducing apparatus for a video tape, comprises a rotary head drum carrying an azimuth-pair-head constituted of first and second magnetic heads, the first magnetic head being formed with a first azimuth gap and the second magnetic head being formed with a second azimuth gap with an azimuth angle different from that of the first azimuth gap, the first and second magnetic heads being cooperative in forming a single longitudinally extending track on a video tape in one cycle of rotation of the rotary head drum, the track having a first section formed by means of the first megnetic head and having a first azimuth pattern and a second section formed by means of the second magnetic head and having a second azimuth pattern which is different from the first azimuth pattern of the first section, means for guiding the video tape onto the rotary head drum for recording and reproduction of a video signal, the guiding means wrapping the video tape on the periphery of the rotary head drum so that the longitudinal axis of the magnetic tape lies perpendicular to the rotation axis of the rotary head drum and that the video tape mates with the periphery of the rotary head drum in a predetermined angular range, and means, cooperative with the azimuth-pair-head, for shifting the latter in a direction parallel to the rotation axis of the rotary head drum, the shifting means shifting the azimuth-pair-head in an axial first direction for forming first longitudinal tracks which are separated relative to each other with a predetermined width of clearance therebetween, and in an axial second direction opposite to the first direction for forming second longitudinal tracks in the clearances between adjacent first tracks.

The shifting means intermittently shifts the azimuth-pair-head relative to the video tape for switching scanning tracks in synchronism with rotation of the rotary head drum. Preferably, the intermittent shift of the azimuth-pair-head is caused in the axial first direction until reaching a first end track and subsequently reversing a shifting direction to shift the azimuth-pair-head in axial second direction until reaching a second end track.

According to a further aspect of the invention, a method for recording and/or reproducing information on a plurality of tracks formed on a magnetic tape and extending in parallel to the longitudinal axis of the magnetic tape, comprising the steps of:

providing a rotary head drum with a pair of first and second magnetic heads constituting an azimuth-pair head, the first and second magnetic heads being formed with azimuth gaps with mutually different azimuth angles and cooperating with each other for scanning a single track during one cycle of rotation of the rotary head drum;

guiding the magnetic tape on the rotary head drum in such a manner that the magnetic tape runs in parallel to the motion path of the azimuth-pair-head and is wrapped onto the periphery of the rotary head drum in a predetermined angular range; and shifting the azimuth-pair-head from one track to other track every one cycle of rotation of the rotary head drum, wherein shifting the magnitude of the azimuth-pair-head in every shifting operation substantially corresponds to twice of axial width of an individual track for scanning every other track.

In the method as set forth above, shifting is caused in a first axial direction and a second axial direction opposite to the first axial direction, and when shifting in the first axial direction, the azimuth-pair-head scans first tracks and in shifting in a second axial direction, the azimuth-pair-head scans second tracks located between the first tracks. In this case, adjacent first and second tracks are formed by means of the azimuth-pair-head in such a manner that the sections of tracks opposing to each other have a different azimuth pattern.

The method may further comprise steps of providing an auxiliary rotary head drum with an azimuth-pair-head and guiding the magnetic tape onto the auxiliary rotary head drum for scanning tracks on the back side of the magnetic tape.

The method as set forth above may also comprise a step of reversing the tape driving direction between forward and reverse directions.

In the alternative, the method as set forth above may further comprise a step of reversing the tape driving direction between the forward and the reverse directions, and a first group of the first and second tracks are formed in a first half of the magnetic tape during forward driving, and a second group of first and second tracks are formed in a second half of the magnetic tape during tape driving in the reverse direction.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiments but are for explanation and understanding only.

In the drawings:

FIG. 9 is an illustration showing one example of a longitudinal recording track pattern to be formed on a magnetic tape;

FIGS. 11(A) and 11(B) show a graph showing a relationship between the magnetic tape and a magnetic head positions during sequential tape feed;

FIGS. 12(a) and 12(B) show a graph showing a relationship between the video signal and a tape head position during intermittent tape feed;

FIGS. 13(A) , 13(B), 13(C) and 13(D) show a relationship between video signals to be recorded by means of first and second heads respectively, and head positions of the first and second heads, during intermittent tape feed; and FIGS. 14 to 19 respectively show head positions at tape start and tape stop in forward and reverse modes, and still start and stop.

DESCRIPTION OF THE PREFERRED EMBODIMENTS

Figure 1:
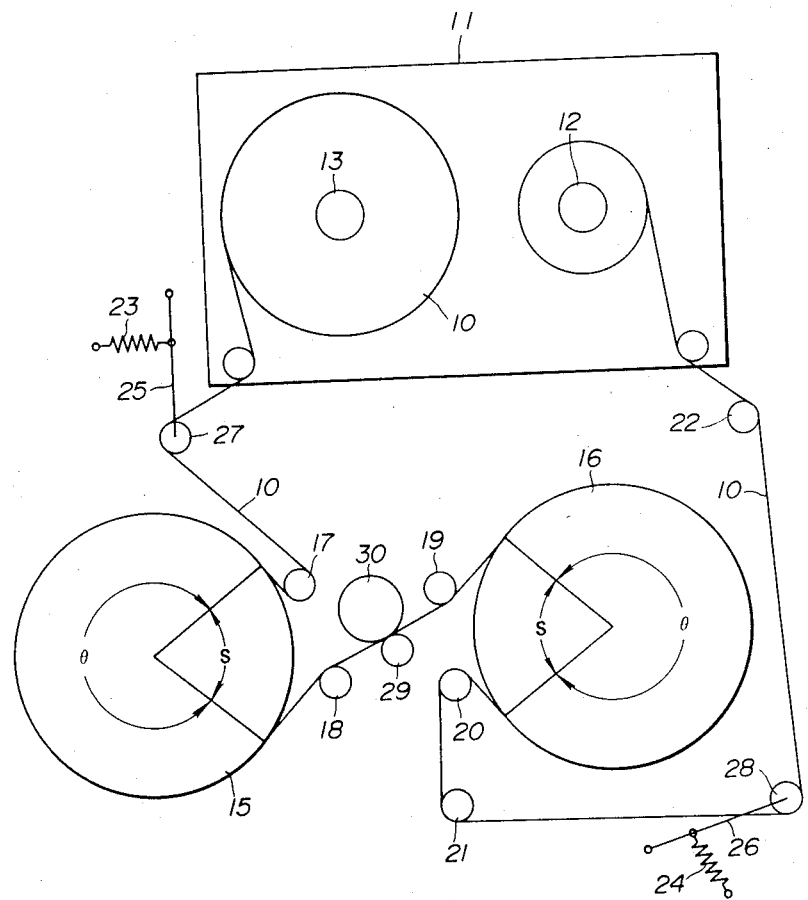
FIG. 1 is a diagrammatic illustration of the preferred embodiment of a longitudinal recording and/or reproducing apparatus with a dual-drum arrangement, according to the present invention.
Figure 2:
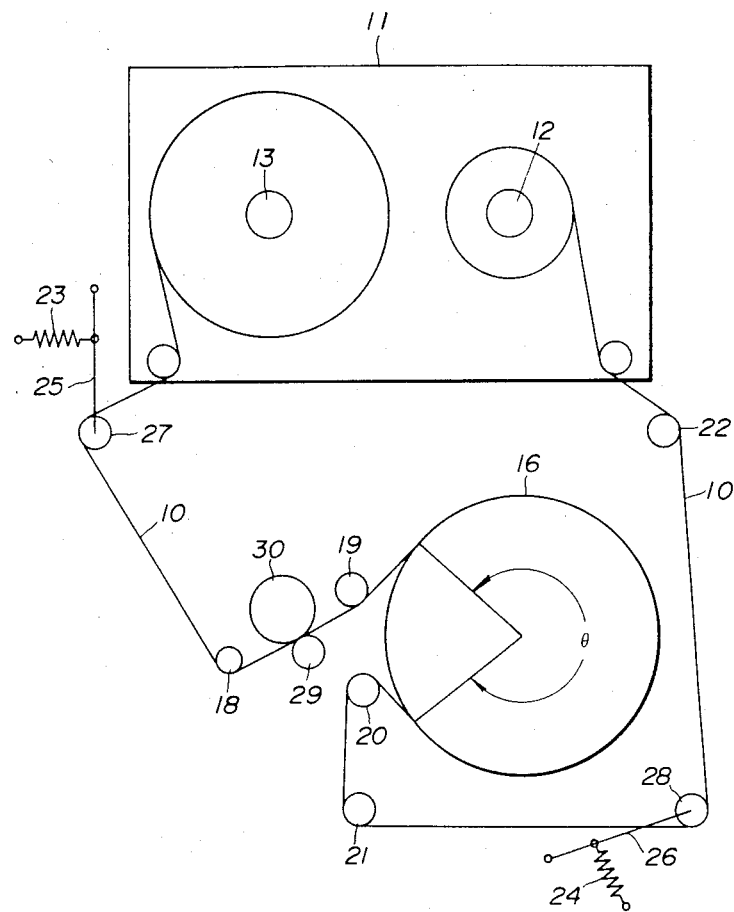
FIG. 2 is a diagrammatic illustration of the preferred embodiment of a longitudinal recording and/or reproducing apparatus with a single-drum arrangement, according to the present invention.

Referring now to the drawings, particularly to FIGS. 1 and 2, there are diagrammatically illustrated the preferred embodiments of a longitudinal recording and/or reproducing apparatus according to the present invention. The shown embodiment of the longitudinal recording and/or reproducing apparatus is employed in a VTR. A VTR tape cassette 11 containing a VTR tape 10 is used for longitudinal recording. The VTR tape cassette 11 has a supply reel 12 and take-up reel 13. The VTR tape is wound around the supply reel 12 and the take-up reel 13 at each end. When this VTR tape cassette 11 is loaded on the preferred embodiment of the longitudinal recording and/or reproducing apparatus, the VTR tape 10 is wrapped around the first and second head drums 15 and 16. For loading the VTR tape 10 onto the first and second head drums 15 and 16, and for defining the tape path, tape guides 17, 18, 19, 20 and 21 are provided. Adjacent to the tape path, tension levers 25 and 26 also are provided. The tension levers 25 and 26 are biased by means of coil springs 23 and 24 so as to provide tension for the VTR tape 10. The tension levers 25 and 26 are pivotable at one end and carry tape guides 27 and 28 at the other ends. Therefore, the tape guides 27 and 28 bias the tape for adjusting tension on the tape constantly. In the vicinity of the tape path between the first and second head drums 15 and 16, capstans 29 and pinch roller 30 are provided for feeding the VTR tape.

In this arrangement, the second head drum 16 mates with the front surface of the VTR tape 10 for recording or reproducing the video signal on the peripheral surface. On the other hand, the first head drum 15 mates the back side of the VTR tape 10 for performing recording and reproducing of the video signal on the back side. It should be appreciated that, when back side recording is unnecessary, single head drum can be used as shown in FIG. 2. In this case, the head drum 15 and the tape guide 17 can be omitted.

Figure 3:
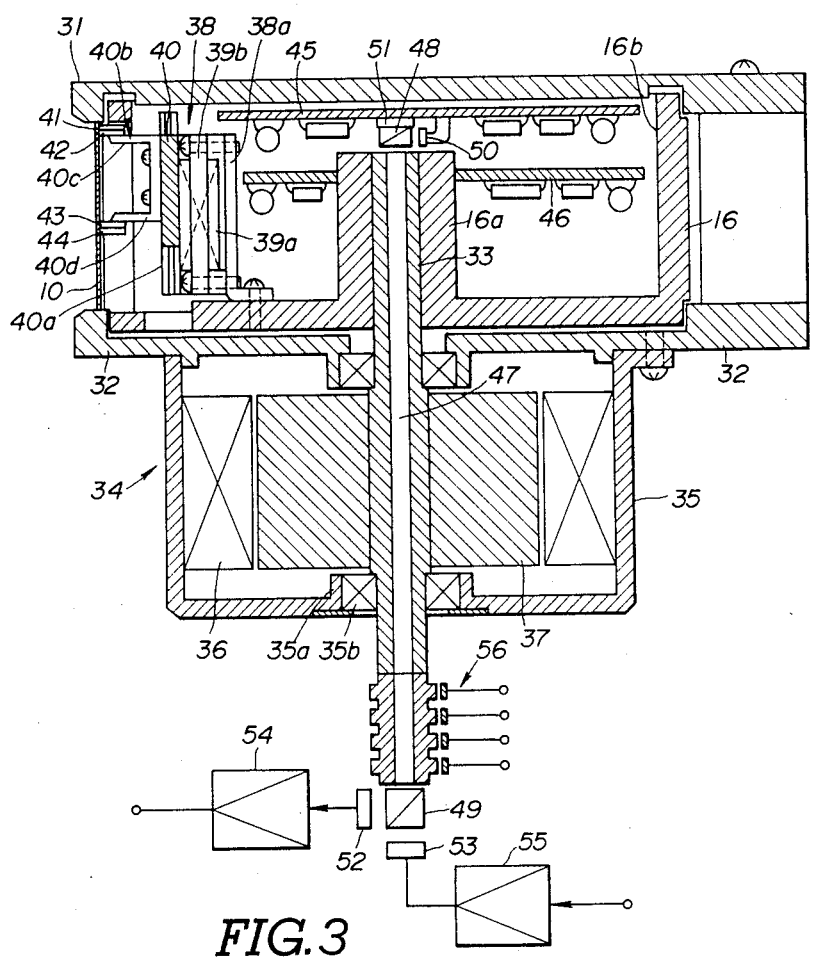
FIG. 3 is a cross-section of a rotary head drum to be employed in he preferred embodiments of the longitudinal recording and/or reproducing apparatus of FIGS. 1 and 2.

FIG. 3 shows the detailed construction of the rotary head drum 16 suitable to be employed in the preferred embodiments of the longitudinal recording and/or reproducing apparatus of FIGS. 1 and 2, the construction of which is also suitable for the rotary head drum 15. The head drum 16 is sandwiched between flange guides 31 and 32. The flange guides 31 and 32 define the tape run path adjacent the rotary head drum 16. The rotary head drum 16 has an inner cylindrical section 16a fixedly mounted at the top of a hollow cylindrical rotary shaft 33. The rotary shaft 33 serves as an output shaft of a motor 34. The motor 34 has a motor housing 35. A boss 35a with a bearing 35b is formed at the bottom of the motor housing 35 in order to rotatably receive the rotary shaft 33. The motor housing 35 houses a stator coil 36 and a rotor magnet 37 in a coaxial relationship to each other. The rotor magnet 37 is fixed to the rotary shaft 33 so as to rotate therewith. Therefore, the rotary shaft 33 is rotatingly driven by means of the motor 34 in order to rotate the rotary head drum 16.

The rotary head drum 16 defines an annular groove 16b. A linear motor 38 is housed within the annular groove 16b. The linear motor 38 is fixedly mounted on the rotary head drum 16 by means of a mounting bracket 38a which is fixed to the bottom of the rotary head drum. The linear motor 38 comprises a a electromagnetic coil 39a and a stator core 39b. A movement 40 is also disposed within the annular groove 16b adjacent the linear motor 38. The movement 40 is coupled to the linear motor 38 so as to be driven by the latter to move with respect to the stator core. The movement 40 is mounted on a guide 40a which extends in parallel to the rotation axis of the rotary head drum 16. Therefore, the movement 40 is guided by the guide 40a to cause thrusting movement in the axial direction.

A head support bracket 40b is fixedly mounted on the movement 40. The head support bracket 40b has a pair of radially extending legs 40c and 40d. A pair of magnetic heads 41 and 42 are mounted on the leg 40c and another pair of magnetic heads 43 and 44 are mounted on the leg 40d. Pairs of magnetic heads 41, 42 and 43 44 respectively form azimuth-pair-heads. These two azimuth-pair-heads are axially aligned with each other.

Figure 4:
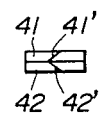
FIG. 4 is a front elevation of an azimuth-pair-head to be employed in the preferred embodiment of the longitudinal recording and/or reproducing apparatus.
Figure 5:
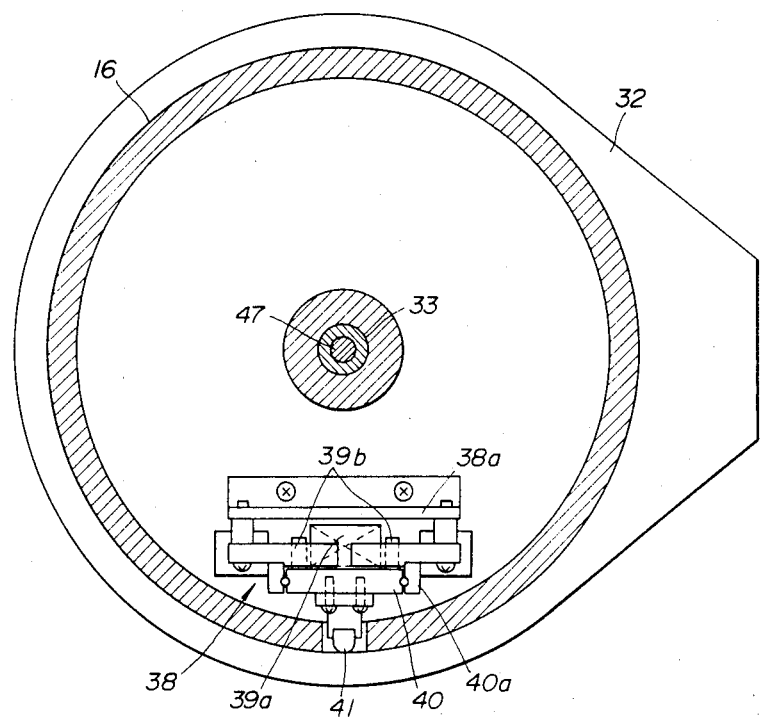
FIG. 5 is a section taken along line IV—IV of FIG. 3.

As shown in FIG. 4, the magnetic heads 41 and 42 forming one azimuth-pair-head have azimuth gaps 41a and 42a of mutually different azimuth angles. Similarly, the magnetic heads 43 and 44 form an azimuth-pair-head of substantially identical construction as that of the azimuth-pair head formed by the magnetic heads 41 and 42.

A pair of upper and lower circuit boards 45 and 46 are also disposed within the annular groove 16b. The upper circuit board 45 is connected to the magnetic heads 41, 42, 43 and 44 and contains a serial-to-parallel converter circuit. On the other hand, the lower circuit board 46 contains a drive circuit for the aforementioned linear motor 38.

A photo-coupling 47 formed of a light-conductive material, is inserted through the axially extending hollow space of the rotary shaft 33. This photo-coupling 47 is designed for transmitting video signal data therethrough. The photo-coupling 47 opposes prisms 48 and 49 at both ends thereof. A light emitting element 50 and a light sensing element 51 are provided in the vicinity of the prism 48. Similarly, a light emitting element 52 and a light sensing element 53 are provided in the vicinity of the prism 49. The light emitting element 52 and the light sensing element 53 are connected to amplifiers 54 and 55 respectively.

Slip rings 56 are provided in the vicinity of the lower end of the rotary shaft 33. The slip rings 56 are connected to a power source to supply electric power to the circuit boards 45, 46, and the linear motor 38.

Figure 6:
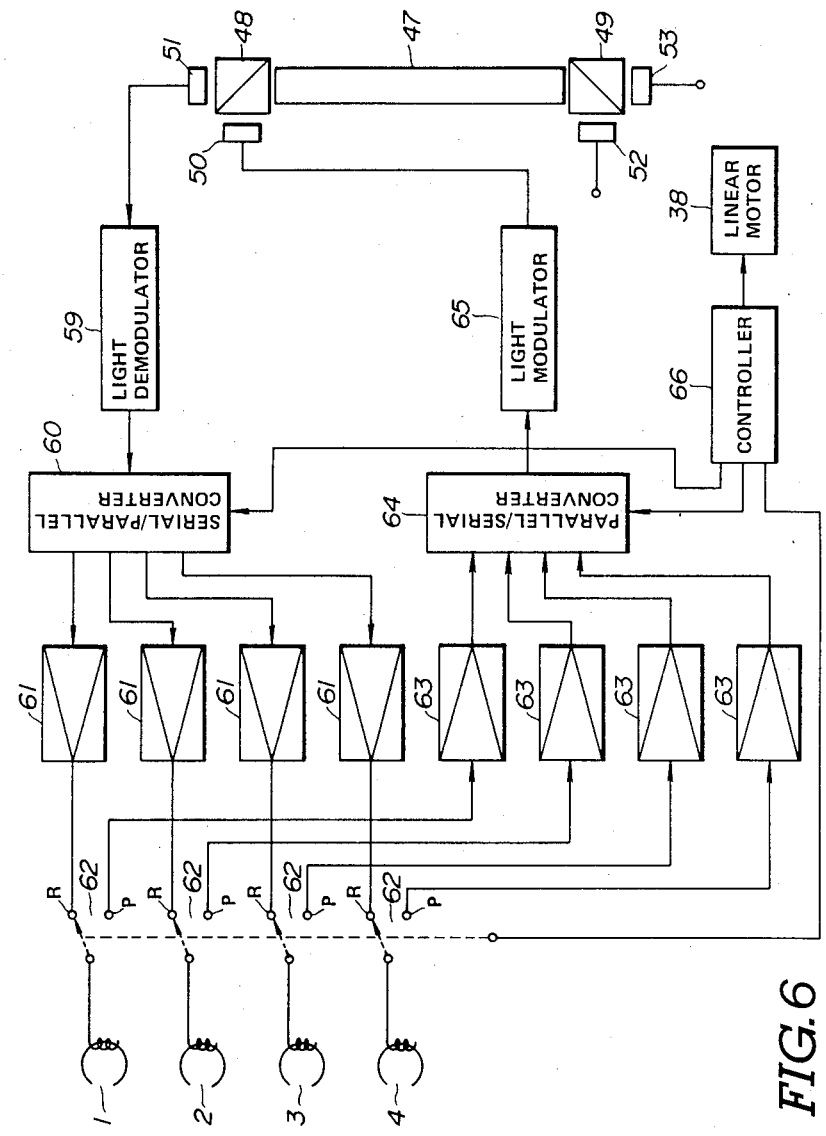
FIG. 6 is a block diagram of a converter circuit employed in the preferred embodiment of the longitudinal recording and/or reproducing apparatus.

FIG. 6 shows a diagram of the circuit associated with the rotary head drum 16. The light sensing element 51 is connected to a serial-to-parallel converter 60 via a light demodulator 59. The serial-to-parallel converter 60 is connected to the magnetic heads 41, 42 43 and 44 via amplifiers 61 and recording terminals R of field switches 62. The light sensing element 51, the light demodulator 59, the serial-to-parallel converter 60, the amplifiers 61, and the field switches 62 constitute a recording circuit for recording data, such as a video signal, onto the magnetic tape.

On the other hand, the field switches 62 have reproducing terminals P. The reproducing terminals P of the field switches 62 are connected to a parallel-to-serial converter 65 via amplifiers 63. The parallel-to-serial converter 64 is connected to a light emitting element 50 via a light modulator 65. The reproducing terminals P of the field switches 62, the amplifiers 63, the parallel-to-serial converter 64, the light modulator and the light emitting element 50 constitute a reproducing circuit for reproducing data stored on the magnetic tape.

A controller 66 is provided for controlling the positions of the field switches 62, the serial-to-parallel converter 60, the parallel-to-serial converter 64 and the linear motor 38.

Figure 7:
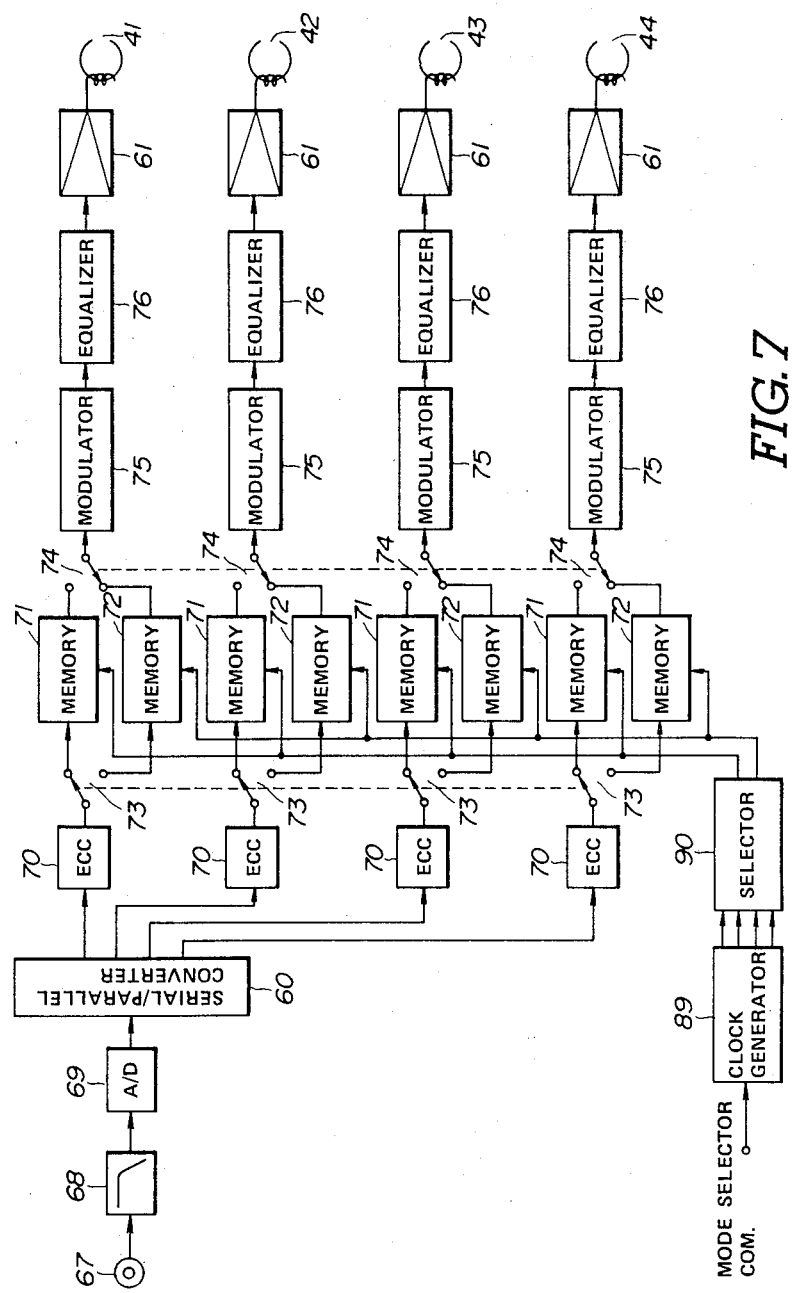
FIG. 7 is a block diagram of a recording circuit in the preferred embodiment of the longitudinal recording and/or reproducing apparatus.

FIG. 7 diagrammatically and explanatorily illustrates a recording circuit in the preferred embodiment of the recording and/or reproducing apparatus. The serial-to-parallel converter 60 is connected to a data input terminal 67, such as a video input terminal, via a low-pass filter 68 and an analog-to-digital (A/D) converter 69. The outputs of the serial-to-parallel converter 60 are connected to error correction code (ECC) encoders 70. Each of the ECC encoders 70 is connected to a pair of field memories 71 and 72 via a switch 73. The field memories 71 and 72 are, in turn, connected to a modulator 74 via a switch 74. The modulator 75 is connected to its corresponding magnetic head 41, 2, 43 or 44 via an equalizer 76 and amplifier 61.

Each of the field memories 71 and 72 is connected to a clock generator 89 via a selector 90. In the shown embodiment, the clock generator 89 generates different frequencies of clock signals. The selector 90 selects one of the clock signals to supply the field memories 71 and 72. The data is written in and read from the field memories 71 an 72 based on the clock signal supplied from the selector 90.

Figure 8:
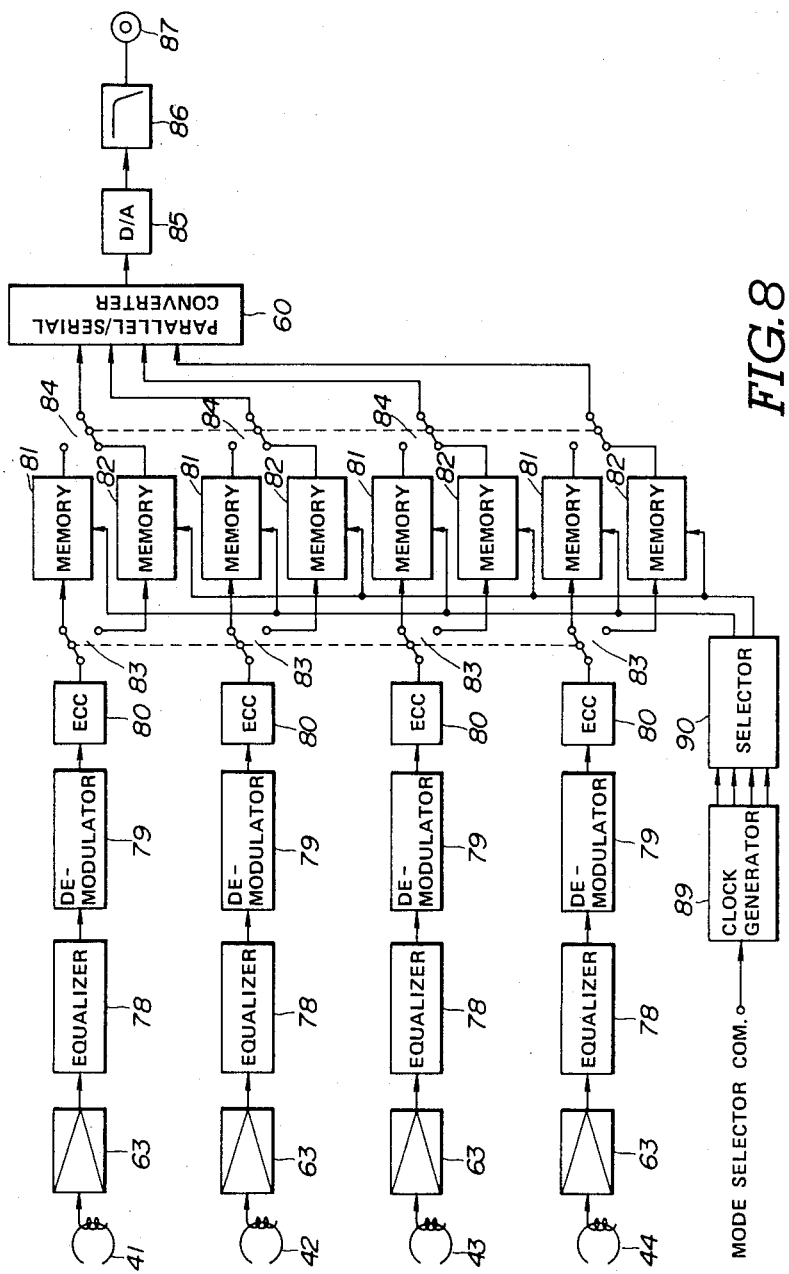
FIG. 8 is a block diagram of a reproducing circuit in the preferred embodiment of the longitudinal recording and/or reproducing apparatus.

FIG. 8 explanatorily depicts a reproducing circuit in the preferred embodiment of the recording and/or reproducing circuit according to the invention. Each of the magnetic heads 41, 42, 43 and 44 are respectively connected to a pair of field memories 80 and 81 via an associated amplifier 63, equalizer 78, demodulator 79, error correction code (ECC) demodulator 80 and switch 83. The switch 83 selectively connects the associated magnetic head 41, 42, 43 or 44 to one of the field memories 81 or 82 for writing data read from the associated magnetic head in selected one of the field memories 81 an 82. The outputs of the field memories 81 an 82 are connected to the parallel-to-serial converter 64. The parallel-to serial converter 64 is, in turn, connected to a data output terminal 87, such as a video output terminal, via a digital-to-analog converter 85 and a low-pass filter 86. The field memories 81 and 82 are connected to the clock generator 89 via the selector 90 to be supplied therefrom the clock signal for time base correction in writing in and reading data.

Operation of the preferred embodiment of the longitudinal or parallel scanning-type recording and/or reproducing apparatus, according to the present invention, will be described herebelow. The magnetic tape 10 in the magnetic tape cassette 11 is extracted from the cassette and wrapped onto the periphery of the rotary head drums 15 and 16. The magnetic tape 10 is not wrapped on the periphery of the rotary head drums 15 and 16 in helical fashion to lay the tape axis oblique to the rotating direction of the drum, but in a parallel fashion to lay the tape axis in parallel to the rotating direction of the drum. As will be seen from FIG. 1, the rotary head drum 16 mates with the front surfaces of the magnetic tape 10. On the other hand, the rotary head drum 15 mates with the back side of the magnetic tape. Therefore, both sides of the magnetic tape 10 are scanned by means of the rotary head drums 15 and 16. As shown in FIGS. 3 and 4, the magnetic heads 41, 42, 43 and 44 are arranged in alignment along the rotary axis of the rotary head drums 15 and 16. These magnetic heads 41, 42, 43 and 44 are fixedly mounted on the movement 40 which is associated with the linear motor 38 as set forth above and by which the magnetic heads 41, 42, 43 and 44 are shifted in the axial direction every scanning cycle.

It shall be noted that for the purposes of this document one scanning cycle is the period that the magnetic heads 41–44 are in contact with the tape 10 during one revolution of a rotary head drum 15 or 16.

Operation of the linear motor 38 is synchronized with rotation of the rotary head drums 15 and 16. Namely, the linear motor 38 is driven to cause axial shift of the magnetic heads at the time when the magnetic heads 41, 42, 43 and 44 are not in contact with the magnetic tape 10. As will be seen in FIG. 1, the magnetic heads 41, 42, 43 and 44 are not in contact with the magnetic tape 10 in angular position range S (approximately 90°). Therefore, an axial shift of the magnetic heads 41, 42, 43 and 44 takes place while the magnetic heads are in this angular range S. As is well known, the rotary head drums 15 and 16 rotate at a speed of 1/60 sec. (16.6 msec.) per cycle. Therefore, the period of time that the magnetic head is within the angular range S is about 4.15 msec. In the preferred embodiment, the linear motor 38 is designed to perform the axial shift of the magnetic heads 41, 42, 43 and 44 in 2 msec.

In the shown embodiment, the magnetic heads 43 and 44 forming the lower azimuth-pair-head form tracks No. 1, No. 2, No. 3 and No. 4 in sequence with an axial shift upwards occuring between very scanning cycle. Conversely while shifting downwards, the magnetic heads 43 and 44 form tracks No. 5, No. 6 and No. 7 with an axial shift downwards occuring between every scanning cycle. In summary, the magnetic heads 43 and 44 scan the No. 1 track first. After one scanning cycle, the magnetic heads 43 and 44 are shifted to mate with the No. 2 track to scan No. 2 track. Similarly, the magnetic heads 43 and 44 are shifted upwards once every scanning cycle to scan the No. 3 and No. 4 tracks. After reaching the No. 4 track and after one cycle of scanning on the No. 4 track, the magnetic heads 43 and 44 are shifted downwards to mate with the No. 5 track which is formed between the No. 3 and No. 4 tracks. Similarly, between every scanning cycle, the magnetic heads 43 and 44 are shifted downward to scan the No. 6 and No. 7 tracks.

Since they are rigidly mounted on the same member as magnetic heads 43 and 44, the magnetic heads 41 are 42 forming the upper azimuth-pair-head are shifted upwardly and downwardly in synchronism with axial shifting of the lower azimuth-pair-head to scan corresponding No. 1 to No. 7 tracks formed on the upper half of the magnetic tape 10.

It should be appreciated that, during every one cycle of scan performed by the magnetic heads 41, 42, 43 and 44, one field data, i.e. one field of video data, is written in or read from the corresponding tracks.

As shown in FIG. 9, a high-density track pattern can be formed on the magnetic tape 10 with substantially no guard band between the adjacent tracks. In this case, since each pair of the magnetic heads 41, 42 and 43, 44 respectively have a different azimuth angle in relation to each other, the azimuth pattern of the upper half in each track becomes different from that in the lower half of the same track. As a result, the upper half of one track will have a different azimuth pattern from that in the adjacent lower half of the upper adjacent track. The herring bone azimuth patterns created in the adjacent tracks successfully eliminate cross-tab between adjacent tracks. By providing differently oriented azimuth patterns in each track, high-density track formation with little or no guard band becomes possible.

The relationships between magnetic tape feed and the axial shift of the magnetic heads 41, 42, 43 and 44 are explanatorily illustrated in FIG. 11. In this case, the magnetic tape 10 is fed sequentially at a constant speed. Therefore, the magnetic heads 41, 42, 43 and 44 are released from the magnetic tape 10 at the angular range S of FIG. 1. At this angular range, the axial shift of the magnetic heads is executed to shift the magnetic heads to their corresponding tracks, as set forth above. On the other hand, when the magnetic tape 10 is fed intermittently, the magnetic tape 10 is intermittently stopped while the magnetic heads 41, 42, 43 and 44 mate with the corresponding tracks. Shifting of the magnetic heads in the axial direction thus intermittently occurs while the magnetic heads are in the angular range S in FIG. 1. While the magnetic heads are in the angular range S, the magnetic tape 10 is fed, as shown in FIG. 12. Furthermore, in the dual drum arrangement of FIG. 1, it would be possible to record and reproduce data on both sides of the magnetic tape alternately, as shown in FIG. 13. As will be seen from FIG. 13, in this two-sided recording or reproduction, the rotary head drums 15 and 16 are activated alternately during each scanning cycle. Axial shifting of the magnetic heads occurs in each rotary head drum 15 and 16 within the interval between the active cycles.

FIG. 10 shows the track pattern formed in two directional recording, i.e. forward and reverse direction recording. It should be appreciated that two directional recording is possible in single sided recording or double sided recording. Single sided recording can be performed by the recording and/or reproducing apparatus of FIG. 2. As will be seen from FIG. 2, the single sided recording system will allow simple construction of the recording and/or reproducing apparatus. On the other hand, the double sided recording system will provide greater capacity of recording. For single sided recording, a single side coated magnetic tape can be used.

In two directional recording, the tracks No. 1, No. 2, No. 3 and No. 4 are formed in the same manner as that discussed with respect to FIG. 9. However, the tracks No. 1 through No. 7 and No. 8 in the upper half of the magnetic tape 10 are formed symmetrical opposite to the No. 1, No. 2, No. 3 and No. 4 tracks with respect to the longitudinal center axis of the magnetic tape. As will be seen from FIG. 10, the starting points and end points of the No. 8, No. 7, No. 6 and No. 5 tracks are axially opposed to the corresponding positions to that of No. 1, No. 2, No. 3 and No. 4 tracks. This track pattern is essential for providing a high quality of video image without causing disturbance of the recorded or reproduced image. The No. 1 to No. 4 tracks are formed in the forward direction recording or reproduction mode. On the other hand, the No. 5 to No. 8 tracks are formed in the reverse direction recording or reproduction mode. Therefore, in the shown embodiment, the data is recorded in the No. 1, No. 2, No. 3 and No. 4 tracks and reproduced therefrom, while the magnetic tape 10 is fed in forward direction. On the other hand, while the magnetic tape is fed in reverse direction, recording and reproduction is performed with respect to the No. 5, No. 6, No. 7 and No. 8 tracks. As will be appreciated, in this case, the last track, i.e. No. 4 track in the forward recording is formed adjacent the first track, i.e. No. 5 track of the reverse direction recording. As set forth, the start and end points of the No. 4 and No. 5 tracks are longitudinally the same positions. This arrangement is particularly advantageous for providing a time-margin for reversing the tape feeding direction. Furthermore, this arrangement makes a servo control for the capstan easier. The track pattern of FIG. 10 is advantageously employed in the shown embodiment to perform recording and reproduction without causing disruption of the signal when reversing the tape feeding direction.

Next, herein below will be discussed the relationship between the tape feeding direction and/or feeding speed, and rotating direction of the rotary head drums 15 and 16. In the shown embodiment, the rotary head drum rotates in the same direction as the tape feed direction in the forward feed. This means that the tape feeding direction in the reverse feed becomes opposite to the rotating direction of the rotary head drum. In the forward feed of the magnetic tape, the magnetic heads 41, 42, 43 and 44 (only head 41 is shown) on the rotary head drum 16 come into contact with the magnetic tape at the position shown in FIG. 14. The magnetic head 41 maintains contact with the magnetic tape in the angular range of about 270° as shown by the arrow in FIG. 14.

Figure 15:
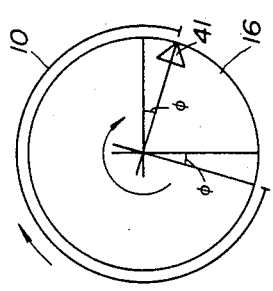
Figure 14:
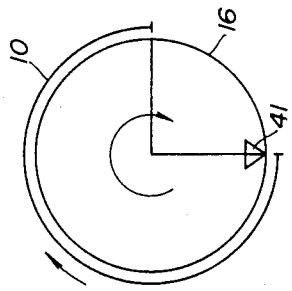

The magnetic head 41 separates from the magnetic tape 10 at an angular position 270° shifted from the starting position in FIG. 14. In this case, since the rotating direction of the rotary head drum 16 is same as the tape feeding direction in the forward feed mode, the relative rotation speed of the rotary head drum becomes lower to cause shortening of the track length to scan whether scanning ends at 270° of the scanning start point. Therefore, the scanning end position may be angularly shifted at the angle $\phi_1$; therefore, the scanning continues to the position angularly advanced at the angle $\phi$ as shown in FIG. 15. Therefore, the scanning end point has to be advanced at the corresponding angle $\phi$. By advancing the scanning end points at the angle $\phi$, the track length can be maintained at about ¾ of the peripheral length ($\pi D$) of the rotary head drum.

Figure 16:
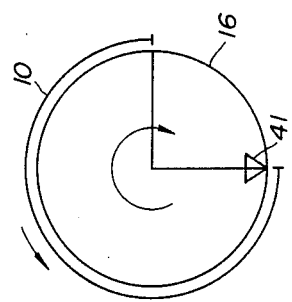

On the other hand, in the reverse direction feed of the magnetic tape, the scanning of the track starts at the head position of FIG. 16. In this case, since the tape feed direction is opposite to rotating direction of the rotary head drum, the relative speed of the rotary head drum with respect to the magnetic tape becomes higher than the standard speed. Therefore, scanning track length becomes longer than ¾ of the peripheral length of the rotary head drum. This requires retarding of the scanning end position at the corresponding angle $\phi$ from the scanning end position in FIG. 16. Therefore, at the corresponding angle $\phi$ as shown in FIG. 15 so that the magnetic head 41 can fully scan the track of the length of ¾ of the peripheral length ($\pi D$) of the rotary head drum.

Figure 19:
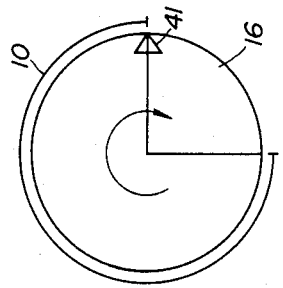
FIG. 19 is a an illustration showing another example of a longitudinal recording track pattern to be formed on the magnetic tape.
Figure 18:
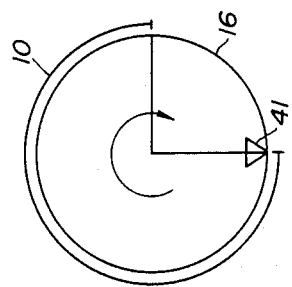
Figure 17:
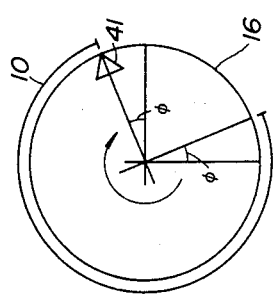

When the scanning of the track on the magnetic tape is performed in a still mode, the magnetic tape is fed intermittently, as set forth with respect to Fig. 12. Therefore, the scanning start position of the magnetic head may not be shifted either in the advancing direction and retarding direction. Therefore, the scanning start position and the scanning end position are never shifted as shown in FIGS. 18 and 19.

It should be appreciated, when tape feed speed is varied from normal speed to be N-times higher speed than normal speed, the shifting angle can be N$\phi$ in forward feed and $-$N$\phi$ in reverse feed. Based on this shifting angle $\phi$ or N$\phi$, the wrapping angle $\phi$ of the magnetic tape 10 with respect to the periphery of the rotary head drum is determined.

The correction angle $\phi$ for causing angular shift of the scanning start position and the scanning end position can be determined according to the following equation:

$$S = t/n$$

where
t is a track length;
n is number of tracks formed by single head during one cycle; and
s is a step length.

In the shown embodiment, the number of tracks to be formed by one magnetic head in one cycle is 7. On the other hand, the track length t can be obtained by:
$$t = (\pi D - s) \times \theta / 360.$$

On the other hand, the step length s can also be illustrated by:

$$s = V/60.$$

In this case, the correction angle $\phi$ can be illustrated by:

$$\phi = 360s / \#D$$

where
V is a tape speed; and
D is a diameter of the rotary head drum.

Returning to FIG. 4, the signal, e.g. video signal, to be recorded on the track is transmitted through the photo coupling 47 to the rotary head drum 16. The signal is received by the circuit on the circuit board 45 and is converted into parallel data therein. This parallel data is distributed to the magnetic heads 41, 42, 43 and 44. The photo coupling 47 also transmits a control signal for the linear motor 38. The linear motor control signal transmitted through the photo coupling is picked up by the circuit on the circuit board 46. According to the control signal, the circuit board 46 controls operation of the linear motor 38. By the operation of the linear motor 38, the magnetic heads 41, 42, 43 and 44 are axially shifted to scan the tracks.

Operation of the circuit on the circuit board 45 will be described herebelow in further detail. As shown in FIG. 7, the outputs of the ECC encoders 70 are written in one of their respectively associated field memories 71 or 72. At this time, the stored data in the other field memory 72 or 71 is read out in a compressed form and applied to the associated magnetic heads 41, 42, 43 and 44 through the modulators 75, equalizers 76 and the amplifiers 61. In this case, a standard clock of the clock generator 89 is selected by the selector 90 and applied to the one of the field memories 71 or 72 into which the output data from the ECC encoder 70 is written through the switches 73. On the other hand, for the other field memory 72 or 71, a clock having a higher frequency than that of the standard clock is selected by the selector and applied. The frequency of the higher frequency clock is determined according to the relative speed between the magnetic tape and the magnetic heads. Adjustment of the clock frequency to be applied to the field memory from which data is read out, helps to maintain a constant track length irrespective of variation of the correction angle $\phi$.

On the other hand, in reproduction of the recorded data on the magnetic tape, the magnetic heads 41, 42, 43 and 44 pick-up data on the magnetic tape 10 and feed the field memories 81 and 82 via respectively associated amplifiers 63, the equalizers 78, demodulators 79 and ECC recorders 80 and through the switches 83. The switch 83 selects one of the associated field memories 81 and 82 to write in the data transmitted from the ECC recorder 80. The write-timing for the selected one of the field memories 81 or 82 is determined by the clock applied by the selector 90. Therefore, the clock is selected by the selector so that the output data of the ECC recorder 80 can be written in the selected one of the field memory 81 or 82 within a predetermined period of time. On the other hand, the other field of memory 82 or 81 is connected to the parallel-to-serial converter 64 via the switch 84 to read out the stored data. Reading of the stored data in the other field memory 82 or 81 is performed in real time. Therefore, the standard clock is selected by the selector 90 and applied thereto.

Therefore, according to the shown embodiment, the magnetic tape can be wrapped parallel to the rotating direction of the rotary head drum. This allows formation of the magnetic tape path in a single plane. Therefore, a simplified tape loading system and tape drive system can be employed for the recording and/or reproducing apparatus. Furthermore, since the tape guides for defining the tape path can be perpendicular to the tape run axis, rotary guides can be employed for smooth feeding of the tape. In addition, since the shown embodiment of the longitudinal recording and/or reproducing apparatus is designed for digital recording, influence in a reproduced video image of variation of bit-rate in recording and reproducing can be successfully avoided to allow high quality reproduced image in forward and reverse mode reproduction and in still mode reproduction. Furthermore, according to the shown embodiment, serial data transmission for the magnetic head can be employed. Additionally, in the serial data transmitted to the magnetic heads, the control signal for the head-shifting linear motor can be superimposed.

Furthermore, the longitudinal recording and/or reproducing apparatus, according to the present invention, can be adapted not only for a single drum recording and/or reproducing system but also for a dual drum system. When the longitudinal recording system according to the invention is applied in a multi-drum system, two-sided recording becomes possible significantly expanding recording capacity of the magnetic tape. In addition, since the present invention allows dual direction recording and reproduction, trick-play becomes possible. Also, by allowing both direction recording and reproduction, access-time for the desired data can be drastically shortened.

In the shown embodiment, since the track pattern to be formed on the magnetic tape in dual direction recording is set so that the scanning start positions and scanning end positions of the mutually corresponding tracks will have the same longitudinal position, disruption of the reproduced image upon reverse tape drive direction can be completely avoided.

Also, advantages can be achieved by forming tracks by means of an azimuth-pair-head consisting of a pair of magnetic heads having different azimuth angles, in that cross-talk between adjacent tracks can be successfully prevented. Furthermore, according to the invention, the first group of tracks are formed during up-shifting of the azimuth-pair-head with track-to-track intervals, each of which corresponds to the width of a track. The second group of tracks are formed during down-shifting of the azimuth-pair-head in the track-to-track intervals left in the first group of tracks. As a result, substntially high-density longitudinal recording becomes possible. This helps to make the size of the magnetic tape cassette compact without degrading recording capacity.

While the present invention has been disclosed in terms of the preferred embodiments of the invention, it should be appreciated the invention may be embodied in various ways. Therefore, various embodiments and modifications of the shown embodiments, which can be implemented without departing from the principle of the invention, should be included within the scope of the invention.

What is claimed is:

1. A parallel scanning video tape recording and/or reproducing apparatus for a magnetic tape, comprising:
   a rotary head drum carrying an azimuth-pair-head constituted of first and second magnetic heads, said first magnetic head being formed with a first gap and said second magnetic head being formed with a second gap with an azimuth angle different from that of said first gap, said first and second magnetic heads being cooperative in forming a single longitudinally extending track on a magnetic tape in one cycle of reording operation, said track having a first section formed by means of said first magnetic head and having a first azimuth pattern and a second section formed by means of said second magnetic head and having a second azimuth pattern which is different from said first azimuth pattern of said first section;
   means for guiding said magnetic tape onto said rotary head drum for recording and reproduction, said guiding means wrapping said magnetic tape on the periphery of said rotary head drum so that the longitudinal axis of said magnetic tape lies perpendicular to the rotation axis of said rotary head drum and that said magnetic tape mates with the periphery of said rotary head drum in a predetermined angular range;
   means, cooperating with said azimuth-pair-head, for shifting said azimuth-pair-head in a direction parallel to said rotation axis of said rotary head drum for switching scanning tracks of said azimuth-pair-head; and
   adjusting means which, when said apparatus performs recording and reproducing both in forward and reverse driving of said magnetic tape, adjusts a scanning angular range over which said azimuth-pair-head scans the magnetic tape in response to the driving direction of said tape to form longitudinal tracks of equal longitudinal length both in forward recording and reverse recording.

2. A parallel scanning video tape recording and/or reproducing apparatus as set forth in claim 1, wherein said shifting means shifts said azimuth-pair-head in a first direction to form a first group of longitudinal tracks and in a second direction opposite to said first direction to form a second group of longitudinal tracks, each of said longitudinal tracks of said first group being formed in spaced apart relationship to the other for leaving a given clearance therebetween, and each of said longitudinal tracks of said second group being formed in said clearances between said longitudinal tracks of said first group.

3. A parallel scanning video tape recording and/or reproducing apparatus as set forth in claim 2, wherein each of said longitudinal tracks of said first group has said first section opposing said second section of adjacent longitudinal tracks of said second group.

4. A parallel scanning video tape recording and/or reproducing apparatus as set forth in claim 2, wherein said given clearance between said longitudinal tracks of said first group corresponds the lateral width of said longitudinal track of said second group to be formed therein.

5. A parallel scanning video tape recording and/or reproducing apparatus as set forth in claim 1, wherein said shifting means is operative in synchronism with rotation of said rotary head drum for shifting said azimuth-pair-head to a next track after every one scanning cycle.

6. A parallel scanning video tape recording and/or reproducing apparatus as set forth in claim 5, wherein said shifting means is operative to shift said azimuth-pair-head during a period in which said azimuth-pair-head is out of said predetermined angular range.

7. A parallel scanning video tape recording and/or reproducing apparatus as set forth in claim 1, wherein said magnetic tape is separated into first and second halves by the longitudinal axis thereof, said first half being scanned by said azimuth-pair-head for recording or reproducion while said magnetic tape is driven in forward direction and said second half being scanned by said azimuth-pair-head while said magnetic tape is driven in reverse direction.

8. A parallel scanning video tape recording and/or reproducing apparatus as set forth in claim 7, wherein track pattern formed in said first half is symmetric to that formed in second half.

9. A parallel scanning video tape recording and/or reproducing apparatus as set forth in claim 1, which further comprises auxiliary rotary head drum with an azimuth-pair-head, said auxiliary rotary head drum being designed and arranged for recording and reproducing on the back side of said magnetic tape.

10. A parallel scanning video tape recording and/or reproducing apparatus as set forth in claim 9, wherein said tape guiding means is designed for guiding said magnetic tape onto both of rotary head drums for sequential operation of said rotary head drums.

11. A parallel scanning video tape recording and/or reproducing apparatus as set forth in claim 1, wherein said rotary head drum is provided with first and second azimuth-pair-heads which are associated with said shifting means to be axially shifted in synchronism with each other.

12. A parallel scanning video tape recording and/or reproducing apparatus as set forth in claim 11, wherein said shifting means comprises a linear motor and movement driven by said linear motor in parallel to the rotation axis of said rotary head drum, said movement carrying said first and second azimuth-pair-heads for simultaneously shifting both heads in axial directions for switching scanning tracks.

13. A parallel scanning video tape recording and/or reproducing apparatus which performs recording and reproducing in both forward and reverse driving of a video tape, comprising:
   a rotary head drum carrying an azimuth-pair-head constituted of first and second magnetic heads, said first magnetic head being formed with a first azimuth gap and said second magnetic head being formed with a second azimuth gap with an azimuth angle different from that of said first azimuth gap, said first and second magnetic heads being cooperative in forming a single longitudinally extending track on a video tape in one cycle of rotation of said rotary head drum, said track having a first section formed by means of said first magnetic head and having a first azimuth pattern and a second section formed by means of said second magnetic head and having a second azimuth pattern which is different from said first azimuth pattern of said first section;
   means for guiding said video tape onto said rotary head drum for recording and reproduction of video signal, said guiding means wrapping said video tape on the periphery of said rotary head drum so that the longitudinal axis of said magnetic tape lies in perpendicular to the rotation axis of said rotary head drum and that said video tape mates with the periphery of said rotary head drum in a predetermined angular range;
   means, cooperative with said azimuth-pair-head, for shifting the latter in a direction parallel to said rotation axis of said rotary head drum, said shifting means shifting said azimuth-pair-head in axial first direction for forming first longitudinal tracks which are separated from each other with a predetermined width of clearance left therebetween, and in an axial second direction opposite to said first direction for forming second longitudinal tracks in said clearances between adjacent first tracks, and
   means for adjusting a scanning angular range over which said azimuth-pair-head scans the video tape to form longitudinal tracks of equal longitudinal length both in forward recording and reverse recording.

14. A parallel scanning video tape recording and/or reproducing apparatus as set forth in claim 13, wherein said shifting means intermittently shifts said azimuth-pair-head relative to said video tape for switching scanning tracks in synchronism with rotation of said rotary head drum.

15. A parallel scanning video tape recording and/or reproducing apparatus as set forth in claim 14, wherein said shfiting means intermittently shifts said azimuth-pair-head in said axial first direction until reaching a first end track and subsequently reversing its shifting direction to shift said azimuth-pair-head in a axial second direction until reaching a second end track.

16. A parallel scanning video tape recording and/or reproducing apparatus as set forth in claim 15, wherein said first and second tracks formed in one first and second direction shifting cycle are cooperative for storing video data for one field.

17. A parallel scanning video tape recording and/or reproducing apparatus as set forth in claim 17, wherein each of said longitudinal tracks of said first group has said first section opposing said second section of adjacent longitudinal tracks of said second group.

18. A parallel scanning video tape recording and/or reproducing apparatus as set forth in claim 17, wherein said shifting means is operative to shift said azimuth-pair-head during a period in which said azimuth-pair-head is out of said predetermined angular range.

19. A parallel scanning video tape recording and/or reproducing apparatus as set forth in claim 16, wherein said given clearance between said longitudinal tracks of said first group corresponds the lateral width of said longitaudinal track of said second group to be formed therein.

20. A parallel scanning video tape recording and/or reproducing apparatus as set forth in claim 16, which further comprises auxiliary rotary head drum with an azimuth-pair-head, said auxiliary rotary head drum being designed and arranged for recording and reproducing on the back side of said video tape.

21. A parallel scanning video tape recording and/or reproducing apparatus as set forth in claim 20, wherein said tape guiding means is designed for guiding said video tape onto both of rotary head drums for sequential operation of said rotary head drums.

22. A parallel scanning video tape recording and/or reproducing apparatus as set forth in claim 16, wherein said rotaryhead drum is provided with first and second azimuth-pair-heads which are associated with said shifting means to be axially shifted in synchronism wih each other.

23. A parallel scanning video tape recording and/or reproducing apparatus as set forth in claim 22, wherein said shifting means comprises a linear motor and movement driven by said linear motor in parallel to the rotation axis of said rotary head drum, said movement carrying said first and second azimuth-pair-heads for simultaneously shifting both heads in axial directions for switching scanning tracks.

24. A parallel scanning video tape recording and/or reproducing apparatus as set forth in claim 14, wherein said video tape is separated into first and second halves by the longitudinal axis thereof, said first half being scanned by said azimuth-pair-head for recording or reproduction while said magnetic tape is driven in forward direction and said second half being scanned by said azimuth-pair-head while said video tape is driven in reverse direction.

25. A parallel scanning video tape recording and/or reproducing apparatus as set forth in claim 24, wherein track pattern formed in said first half is symmetric to that formed in second half.

26. A method for recording and/or reproducing formation on a plurality of tracks formed on magnetic tape and extending in parallel to the longitudinal axis of said magnetic tape, comprising the steps of:
   providing a rotary head drum with a first and a second magnetic head constituting an azimuth-pair-head, said first and second magnetic heads being formed with azimuth gaps with mutually different azimuth angles and cooperating with each other for scanning a single track during one cycle of rotation of said rotary head drum;
   guiding said magnetic tape on said rotary head drum in such a manner that said magnetic tape runs in parallel to the motion path of said azimuth-pair-head and is wrapped onto the periphery of said rotary head drum in a predetermined angular range;
   shifting said azimuth-pair-head from one track to other track every one cycle of rotation of said rotary head drum, wherein a shifting magnitude of said azimuth-pair-head in every shifting operation substantially corresponds to twice the axial width of individual track for scanning every other track;
   driving said tape recording medium along a tape path in both forward and reverse directions; and
   adjusting a scanning angular range over which said heads scan said tape in response to the driving direction of said tape whereby the longitudinal length of each of said tracks formed by said heads per rotation of said rotary head drum is equal in both forward recording and reverse recording.

27. A method as set forth in claim 26, wherein shifting is caused in first axial direction and second axial direction opposite to said first axial direction, and in shifting in said first axial direction, said azimuth-pair-head scans first tracks and in shifting in second axial direction, said azimuth-pair-head scans second tracks located between said first tracks.

28. A method as set forth in claim 27, wherein adjacent first and second tracks are formed by means of said azimuth-pair-head in such a manner that the sections of tracks opposing to each other have a different azimuth pattern.

29. A method as set forth in claim 27, which further comprises a step of reversing tape driving direction between forward and reverse directions, and a first group of said first and second tracks are formed in a first half of said magnetic tape during forward driving, a second group of first and second tracks are formed in a second half of said magnetic tape during tape driving in said reverse direction.

30. A method as set forth in claim 26, which further comprises steps of providing auxiliary rotary head drum with an azimuth-pair head and guiding said magnetic tape onto said auxiliary rotary head drum for scanning tracks on the back side of said magnetic tape.

31. A method as set forth in claim 26, which further comprises a step of reversing tape driving direction between forward and reverse directions.

32. A parallel scanning tape recording and/or reproducing apparatus for a tape recording medium, comprising:
   a rotary head drum for rotating in a fixed direction,
   head means carried by said rotary head drum for recording and/or reproducing a signal on and/or from said tape recording medium,
   means for guiding said tape recording medium onto said rotary head drum, said guiding means wrapping said tape recording medium on the periphery of said rotary head drum so that the longitudinal axis of said tape recording medium lies perpendicular to the rotation axis of said rotary head drum and so that said tape recording medium mates with the periphery of said rotary head drum in a predetermined angular range;
   shifting means for shifting said head means in a direction parallel to said rotation axis of said rotary head drum so that the position of tracks formed by said head means is changed in the direction of the width of said tape recording medium;
   driving means for driving said tape recording medium along a tape path in both forward and reverse directions; and
   adjusting means for adjusting a scanning angular range over which said head means scans said tape recording medium in response to the driving direction of said tape recording medium whereby the longitudinal length of each of said tracks formed by said head means per rotation of said rotary head drum is equal in both forward recording and reverse recording.

* * * * *